Patented Sept. 24, 1929

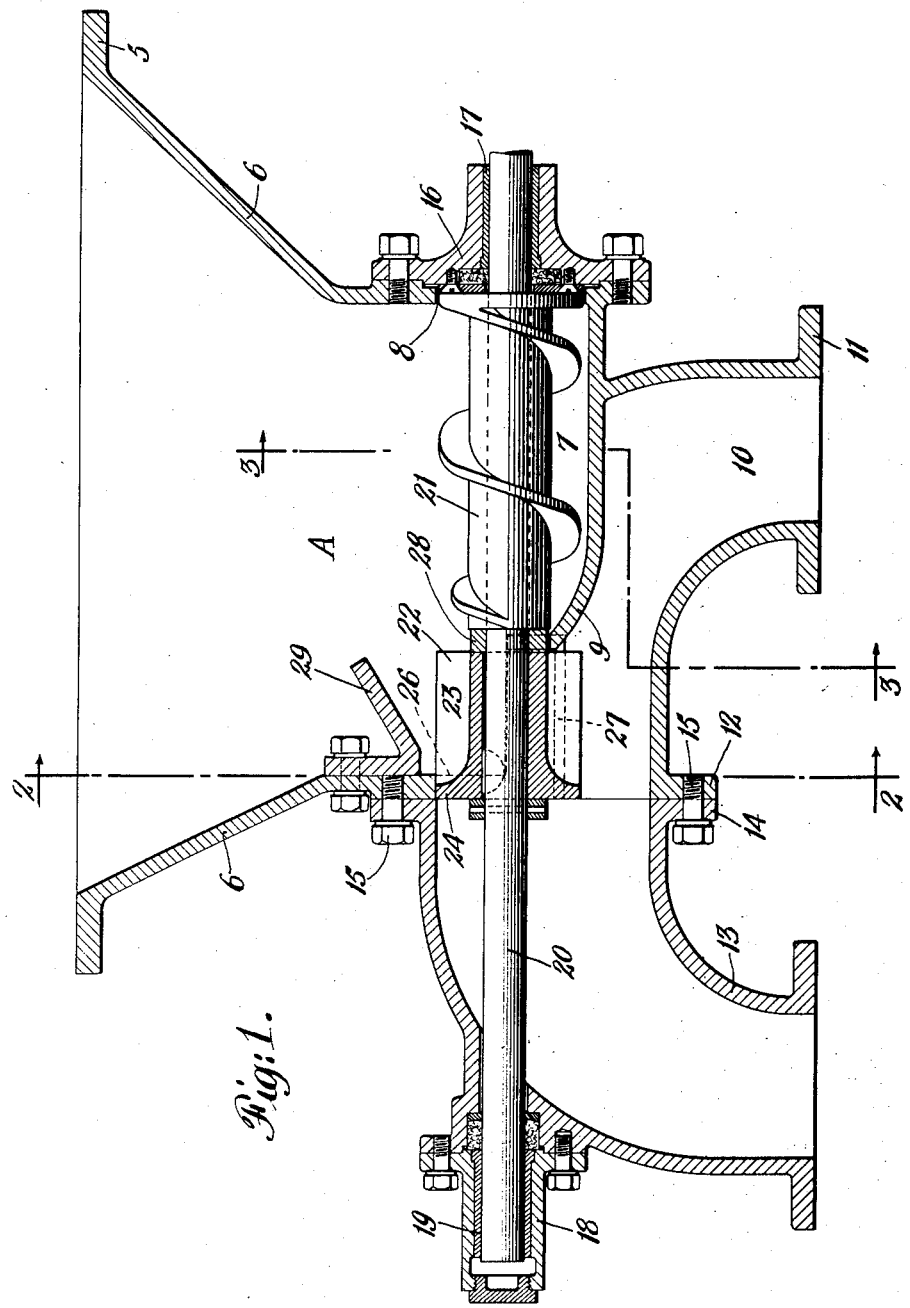

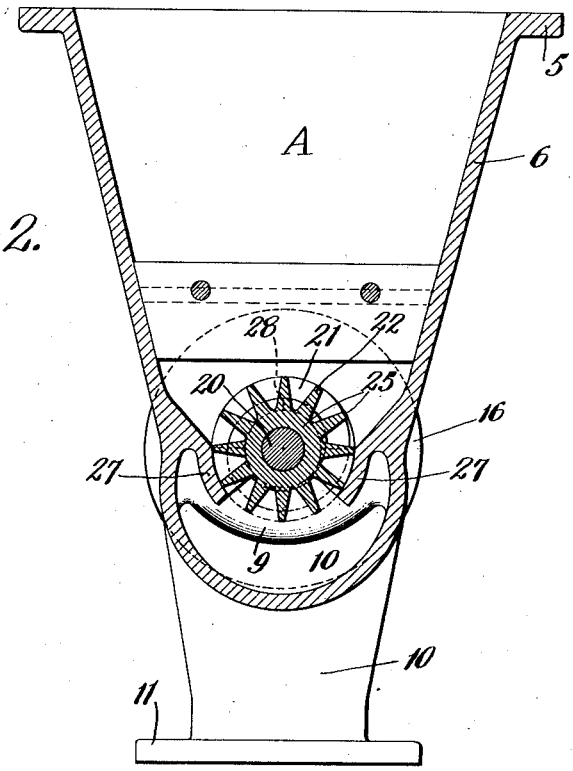
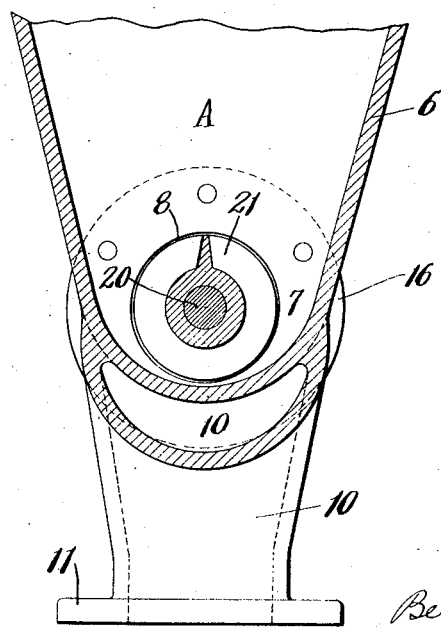

1,729,032

UNITED STATES PATENT OFFICE

BERTRAM J. CROSS, OF PIERMONT, NEW YORK, ASSIGNOR TO INTERNATIONAL COMBUSTION ENGINEERING CORPORATION, OF NEW YORK, N. Y., A CORPORATION OF DELAWARE

FEEDER

Application filed August 18, 1926. Serial No. 129,886.

This invention relates to an apparatus for discharging comminuted materials, such as pulverized coal and the like, from a bin or other receptacle, and is particularly useful wherever it is desirable to have a steady, uniform flow of material from the bin. For convenience I have described the operation of the feeder in connection with the feeding of coal to a pulverized fuel burner.

It is the primary object of my invention to provide a feeder which will insure a continuous uniform flow of coal, the rate of which may be varied at will to suit conditions without interfering with the evenness of the supply.

A further object is the provision of a feeder which will prevent what is known as "flooding", i. e. the free running of the coal through the feeder at a rate faster than intended. This frequently occurs in the ordinary type of feeder when, for some reason, the coal in the bin becomes mixed with sufficient air to be fluid. In such circumstances the coal will flow through the ordinary screw feeder as if it were a liquid, chasing around the screw faster than the screw is revolving, with consequent unevenness of flow and without control.

It is a further object of my invention to provide a combined screw and star wheel feeder.

These objects, together with such others as may hereinafter appear, or are incident to my invention, I obtain by means of a construction which I have illustrated in preferred form in the accompanying drawings, wherein—

Fig. 1 is a longitudinal section through my improved feeder, the screw shaft being shown in elevation.

Fig. 2 is a section on the line 2—2 of Fig. 1, and

Fig. 3 is a section on the line 3—3 of Fig. 1.

As an extension of a pulverized coal bin (not shown) I provide a hopper member A having inclined side walls 4 and end walls 6, the upper edges of which are provided with flanges 5 by means of which the member A is bolted to the bin proper. The side wall members 4 merge at the bottom to form a trough portion 7 having, at one end, an opening 8 and an upwardly sloping portion 9 at the other end (see Figs. 1 and 2).

Below the trough the member A is formed into a conduit 10 having flanges 11 by means of which an air line may be connected thereto. The other end of the conduit 10 has a flange 12 to which is secured the elbow member 13 by means of flange 14 and bolts 15.

The bearing 16, having bushing 17, is secured to the member A adjacent the opening 8, and the elbow 13 also has an opening adjacent to which is secured the bearing member 18, having bushing 19.

The shaft 20 is mounted to revolve in these two bearings and carries the screw portion 21 in the trough 7.

The star feeder 22 is keyed to the shaft 20 at the end of the screw 21. This star feeder is somewhat different from the ordinary type in that the pockets 23 are closed at one end by walls 24 at the end thereof which merge with the teeth 25 to form a continuous circular end portion.

The shaft 20 is revolved by any desired form of motor, and it will be seen that as the shaft revolves, the coal in the bin will be moved toward and into the pockets 23 of the star feeder, and that revolution of the star feeder will deliver the coal which has been fed into the pockets 23 into the conduit 10 where the coal will be picked up by the moving current of air therein and carried to the point of use.

It is, of course, necessary to provide a seal about the star feeder in order to prevent the powdered coal from leaking out of the bin, and I accomplish this by extending one of the end walls 6 down around the closed end of the star feeder to substantially below the horizontal plane of the center of the shaft 20, to form a bearing 26 in which the circular end of the star feeder revolves. This can be best seen in Fig. 1. As the pockets of the star feeder are closed to form a circular portion at the end, as above explained, it will be seen that by fitting the bearing 26 closely thereabout, an effective seal will be formed above the center of the shaft 20 between the bin and the conduit 10.

The side walls 4 at the portions adjacent the star feeder are also provided with inwardly projecting bearings 27, extending from the bearing 26 back to the upwardly sloping part 9 of the trough 7. The teeth 25 of the star feeder, when revolving, are in contact with the bearings 27, and it will be seen that no coal can pass the star feeder at these points, except that which is carried in the pockets thereof.

The collar 28 separates the screw 21 and the star feeder 22 and bears against the upwardly sloping portion 9 of the trough which is formed to make a close fit therewith, and extends up to the horizontal plane of the center of the shaft 20, thereby effectively sealing the bin below the center of the shaft.

The angular member 29 which is secured to the wall 6 of the bin just above the star feeder 22, will cause the coal moved by the screw to pack evenly into the pockets 23 of the star feeder, and thus insure that a uniform amount of coal is delivered by each pocket into the conduit 10.

It will be seen that the interposition of the star feeder 10 between the screw 21 and the conduit 10 will effectively prevent the coal from chasing about the screw 21, and that trouble from such flooding will be entirely eliminated. Uniform quantities of coal will be delivered by each pocket of the star feeder as it revolves, and the rate of flow can be regulated to suit conditions by varying the speed at which the shaft 20 revolves.

I claim:—

1. A feeder for pulverized coal and the like, comprising a bin having a revolving star feeder, means for moving the coal in the bin into the pockets of the star feeder, and a member sloping inwardly toward the star feeder against which the coal is forced by said means.

2. A feeder for pulverized coal and the like, comprising a bin having a revolving star feeder, a bearing at one end of the star feeder for sealing a portion thereof, and a bearing at the other end for sealing the other portion thereof.

3. A feeder for pulverized coal and the like comprising a bin having a revolving star feeder, the pockets of which are closed at one end and open at the other, sealing means at the periphery of the feeder adjacent the end at which the pockets are closed and sealing means at the other end of the star feeder.

4. A feeder for pulverized coal and the like comprising a bin having a revolving star feeder, the pockets of which are closed at one end and open at the other, sealing means at the periphery of the feeder adjacent the end at which the pockets are closed for sealing a portion thereof and sealing means adjacent the central portion of the feeder at the end at which the pockets are open for sealing the other portion thereof.

In testimony whereof I have hereunto signed my name.

BERTRAM J. CROSS.